United States Patent [19]

Brown et al.

[11] 3,894,977

[45] July 15, 1975

[54] SEALANT COMPOSITION

[75] Inventors: George A. Brown, Casselberry, Fla.; Francis Michael Hinds, Decatur, Ala.

[73] Assignee: Southern Line Cleaning, Inc., Casselberry, Fla.

[22] Filed: Aug. 27, 1973

[21] Appl. No.: 391,670

[52] U.S. Cl. .......................... 260/18 EP; 260/37 EP
[51] Int. Cl. .............................................. C08g 51/72
[58] Field of Search .......... 260/37 EP, 830 S, 18 EP

[56] References Cited
UNITED STATES PATENTS

| | | | |
|---|---|---|---|
| 2,789,958 | 4/1957 | Fettes et al. | 260/830 S |
| 2,798,833 | 7/1957 | Lapsensohn et al. | 260/830 S X |
| 3,075,871 | 1/1963 | Barlet | 260/830 S X |

OTHER PUBLICATIONS

Lee et al., Handbook of Epoxy Resins, McGraw–Hill Book Co., 1967, pp. 11–21, 11–22, 16–21, 16–22, 16–23.

*Primary Examiner*—Lewis T. Jacobs
*Attorney, Agent, or Firm*—Mason, Mason & Albright

[57] ABSTRACT

A liquid epoxy pipe line sealing tercopolymer composition suitable for application in underground pipe lines by trowel or centrifugal force through a rotating nozzle has a pot life of at least 2 hours or more and gels within about 10 to 48 hours, curing in full within about 10 days. The composition contains about 50–85% epoxy resin, 5–35% polysulfide polymer, 1.5–10% amine curing agent and 2–15% inert filler. The sealant can have up to 5% of an inhibitor in the form of an unpolymerized fatty acid. Preferably, dimerized and/or trimerized acids are polymerized in situ and function as pot life extenders and/or flexing agents, when used in amounts up to about 30% with the non-protonated epoxy base and about the same amount with the protonated epoxy acid. These acids replace an equal amount of polysulfide polymer.

6 Claims, No Drawings

SEALANT COMPOSITION

This application is related to U.S. Pat. No. 3,753,766. In the above patent, a method of sealing under-ground pipe lines (usually gas pipe lines) up to about 16 inch diameter is disclosed. In pipe line systems of relatively small diameters, the sealing composition can best be applied from an applicator-TV camera assembly moved through a section of pipe line while being observed through the TV camera positioned to view the assembly and pipe line sites being coated.

The technique involves the back and forth manipulation of the assembly and the selective application of a cureable composition to the sites of faults and/or seams in the pipe line system. The preferred practice is to use 3–10 pound increments or loads from a mixed batch of, say, 25–100 pounds of sealant. A load can be in a container mounted within the assembly so that the composition is extruded by pressure, either air pressure or mechanical (piston) pressure controlled from above the ground by the TV camera observer.

Thus, the pot life of the composition must be at least two hours, preferably more than three hours so that all during operation, the composition can be worked, thrown or slung by centrifugal force to deposit a coating of about 1/8 inch thick through a nozzle or disc rotating at 500–20,000 RPM. It is therefore necessary that the composition remain a workable liquid or semi liquid for about three hours or more so that it can be thrown through holes of 1/8–1/4 inch diameter when being applied. The compositions herein can also be applied by trowel, but essentially the same sealant characteristics should obtain, namely, the sealant should be workable for the prescribed period of time.

Also, it is essential that the composition gel within about 10 to 48 hours and substantially cure within about 10 days. By "gel" it is intended that up to 5 p.s.i. can be applied to the treated pipe line system without the newly applied coating developing pin or blow holes. By "cure" it is intended that at least 30 p.s.i. can be applied once the crosslinking of the ingredients has substantially been completed. The usual underground pipe line temperatures are 75°F. ± 10° and the above time periods are applicable at this temperature. At lower temperatures or under certain circumstances, the addition of an accelerator can be resorted to and hasten gel and cure times.

The lower the temperature and/or the less curing agent used, the longer the pot life. At relatively high temperatures, i.e. above 70°F., less curing agent is used and when the operating temperature is about 90°–95°F. or higher, an inhibitor can be mixed in the composition. At lower temperatures, the inhibitor greatly increases pot life. In general, the amount of inhibitor should be about 2–10% by weight of the curing agent. Fatty acids, such as stearic or oleic acid as well as dibasic acids, including oxalic acid, are suitable.

Succinic and phthalic anhydrides are also operative as accelerators within the above ranges, namely about 2–10% of the accelerator agent and can be used when temperatures are below 65°F. or at higher temperatures if desired to affix a time delay in the pot life/gellation and cure cycle of the resin.

A finely divided asbestos filler can also be used to control the viscosity of the sealing composition and the amount of such an inert filler used can vary widely, but generally will comprise about 2–15% by weight of the total composition. The preferred sealing composition used to coat the interior of a cast iron horizontal pipe line, using a nozzle such as that shown in FIG. 1 of Ser. No. 104,424 which is rotated at 500–20,000 RPM, preferably 10,000–15,000 RPM, is as indicated below.

The compositions of the present invention include a liquid epoxy resin, flexing agents, an amine curing agent and, optionally, an inhibitor and/or accelerator. The preferred compositions include up to 30% dimer and/or trimer acids. The former poly-basic acid being from 75–97% $C_{36}$ dibasic acid with a molecular weight (MW) of approximately 565, and from 3–25% $C_{54}$ tribasic acid with an approximate MW of 845, also containing a trace of monobasic $C_{18}$ fatty acids with an approximate MW of 282; and the latter being from 80–90% $C_{54}$ tribasic acid, 10–20% dibasic acid with a trace of monobasic fatty acids polymerized from unsaturated $C_{18}$ fatty acids and residual monobasic acids; i.e. linoleic.

The term "liquid epoxy resin" means resins equivalent to Shell Chemical Company 800 Series and include the preferred base resin, namely, the condensation product of epichlorohydrin and bisphenol A. Shell's 800 series can be used for the non-protonated, or basic, epoxy and Union Carbide's ERL 4200 series can be used for the protonated, or acid, epoxy. An example of the latter being ERL 4221 derived by the peroxidation of olefin and characterized as an aliphatic diepoxide resin. Other useful resins are polyglycidal ether types based on epichlorohydrin such as condensations of the latter with aliphatic polyols (glycerin), wherein the resin is liquid at room temperature.

The molecular weight of the preferred resins are relatively low and they have an epoxide No. 170–220. The Epon 800 series resins can be modified through reaction or blending with aliphatic polyepoxides, monoglycidyl ethers (allyl, butyl, etc.) or phthalates. About 50–90%, preferably 55–70%, of resin can be used in the formualtion of the sealing compositions disclosed herein.

The flexing agents of particular interest are polysulfide polymers of low molecular weight such as LP series made by the Thiokol Corporation. For example, LP-3 is a difunctional mercaptan made from 98 mole % of bis(2-chloroethyl) formal and 2 mole % of trichloropropane. Because LP-3 is liquid, having a molecular weight of about 1,000 (viscosity of 700–1,200 centipoises at 25°C.); and the dimer and trimer acids such as those manufactured by Emery Industries (the Empol series whose composition is outlined above) are liquid with viscosities ranging from 5,000–60,000 centipoises, and these polymers are particularly adaptable for application by slinger nozzle.

Additional, but less preferred, flexing agents are urethane and other cureable resilient materials including non-reactant asphallic compounds can be added for load. The amount of flexing agent varies between 5–35%, but is preferably 10–25% of the sealant.

The curing agent can be conventional and the following are suitable: Tri-dimethyl-aminomethyl-phenol; Triethylenetetramine; Diethylenetriamine; Dimethylaminopropylamine; Dimethyl-aminomethylphenol; Diethylaminopropylamine; Benzyldimethylamine; Diethylamine; 2-Ethyl hexoic acid salt of Tri-dimethyl-aminomethyl phenol.

Also, O-phenylenediamine, P-aminophenol, N-methyl morpholine and related amines can be used.

About 1.5–10%, preferably 2–8%, of curing agent is used in the sealant and preferred amines are tertiary amines.

An inhibitor to prolong the pot life of the composition is preferred when the load or increment is used for more than two hours. Fatty acids, saturated and unsaturated having 6–18C atoms can be used as can hydroxy monobasic and dibasic acids having 2–10 C atoms, such as oxalic and salicylic. When higher amounts of amine curing agents are used, up to 5% of this type of inhibitor can be used, but preferably less than 3% of inhibitor is used in place of the resin.

It has also been found that replacing up to about 30% of the flexing agent with equal amounts of polymerized fatty acids, dimer and/or trimer acids, will increase the flexibility of the compositions and extend or prolong the pot life of the composition. When dimer and/or trimer acids are used, a fatty acid or other inhibitor is unnecessary. As set forth above, these dimer and trimer acids are derived from the polymerization of 18 C atom fatty acids and Empol trimer (Empol 1040/1041) and/or Dimer (Empol 1010 through 1024) have been used with good results. Further, the dimer and trimer acids add extra strength and elasticity to the sealant compositions when forming a tercopolymer after compounding with the polysulfide and epoxy resins. Thus, the preferred compositions include dimer and/or trimer acids with no unpolymerized fatty acid or other inhibitor. The amounts of the dimer and trimer acids can be up to 30%, but it is preferred that about 7–12% be used.

The dimer and/or trimer acids are those polymerized products made by heating unsaturated acids, linoleic in particular, in the presence of a catalyst. The usual product is a mixture of about 3–25% trimer and 97–75% dimer acids with residual $C_{18}$ monobasic fatty acid and trade amounts of $C_{72}$ acid. So long as the dimer and/or trimer acids are liquid at room temperature, any commercial product can be used.

An inert filler is also included in amounts of about 2–15% in the sealant, preferably 3–15%, to control the viscosity and to add flexibility to the composition. The preferred filler is asbestos, finely divided or fibrous, although diamataceous earth and silica can also be used. These fillers in no way affect the chemistry of the sealants and are "inert" with respect to the polymerization of the ingredients.

Other fillers include, carbon black, furnace black and graphite. All of these fillers decrease the pot life of the sealant slightly (because of the increase in viscosity). The graphite, carbon and furnace black fillers find particular use in coatings that are conductive. Such coatings afford cathodic protection to iron or steel pipe systems. Also, these coatings can be tested electrically to confirm that the integrity of the sealant remains intact.

The following composition was applied with good results at about 85°F. temperature in an underground 8 inch gas pipe line. The composition has a pot life of about 4 hours and solidifies to a gel in about 12 hours with a complete cure in about 4 days. After initial gel, the pipe line was tested with up to 5 p.s.i. Up to 30 pounds or more could be applied to the pipe line once complete cure had taken place (Tests were applied at 15 psi).

|  | % by weight |
|---|---|
| Shell "Epon" Resin 828 (A type) Epichlorohydrin-Biphenol, Epoxide No. 180–188 | 62 |
| Flexing agent — Thiokol LP—3 Polysulfide rubber | 26 |
| Asbestos (fibrous) | 9.8 |
| Curing agent Sherwin Williams BDMA (Benzyl Dimethyl amine) | 2 |
| Oleic acid | 0.3 |

The resin and flexing agent are mixed by folding and/or milling until blended, then the asbestos is slowly added, avoiding agglomoration or flocculation, until homogeneous. This mixture is then packaged for the field to comprise a load for a supply cylinder or quick release tube which is attached to the nozzle to be moved through a pipe line. Usually, 25–100 pounds is mixed and used as needed in 3–10 pound increments.

When used with a fatty or dibasic acid inhibitor, the phthalic anhydride accelerator causes the sealing composition to quickly gel after an initial delay of, say 1–2 hours. The phthalic anhydride operates to cure the epoxy resin but not the polysulfide flexing agent which is cured by the copolymerization with the epoxy. Carbon black and sulfur may be added to extend the polysulfide cure in developing additional cross linkage.

The normal load can be used to coat bands of about 1–2 inches wide to bridge the connecting seams between 12 or 16 feet lengths of pipe or to completely coat the interior surfaces of pipe. Thus, about 400 feet of pipe can be coated with bands of composition about ⅛ inch thick. In other words, about 60 grams of composition per seam can be used with the bands averaging about 1.5 inch wide in an 8 inch diameter pipe line.

The above epoxy resin is of the low mole molecular weight type and have an epoxide equivalent No. 180-188. With 1,800 grams of the above sealing composition the following relationships of pot life and cure time are applicable:

| Temperature | Catalyst (Gms) | Pot-Life | Gellation | Full Cure |
|---|---|---|---|---|
| 70°F. | 49 gms. | 2.7 – 3.2 Hrs. | 12 Hrs. | 3.2 days |
| 76° | 47 gms. | *" | 15 Hrs. | 3.9 days |
| 80° | 44.5 gms. | " | 18 Hrs. | 4.8 days |
| 84° | 41.5 gms. " | 22 Hrs. | 5.8 days |  |
| 88° | 38.5 gms. | " | 27 Hrs. | 7.0 days |
| 92° | 37.0 gms. | " | 33 Hrs. | 9.2 days |
| 96°* | 35.5 gms. | " | 40 Hrs. | 12.0 days |

*Add .1% Oleic acid before adding catalyst — .2% from 98°F. up. 38 grams of curing agent will affect a full cure at any temperature range and is a safe addition in the field per 1800 gram charge of compound.

In general, with each 2° rise in temperature between 70°–78°F., a gram of catalyst can be omitted from a load of about 1,800 grams to insure the same pot life and cure time. Above 80°F., 1.5 grams of catalyst can be omitted from each 2° rise in temperature. Above 90°–95°F., an inhibitor should be added, in the amount of 0.1–0.2% based on the weight of the curing agent for every 2°F. rise based on the amount of curing agent used at 70°F.

In order to demonstrate the increase in pot life of the tercopolymer using dimer and/or trimer acid (Empol 1040) the following compositions were tested in the percentages noted. The resin used-epichlorohydrin and bisphenol A (Shell Epon 828); the polysulfide-(LP 3 Thiokol); the amine-benzyldimethylamine (Sherwin Williams); and the dimer-trimer (Emery Ind. Empol 1040). The filler and other additives were omitted.

| | % Resin | % Polysulfide | % Amine | % Dimer and/or Trimer |
|---|---|---|---|---|
| 1. | 67.64 | 28.98 | 3.38 | 0 |
| 2. | 67.64 | 24.15 | 3.38 | 4.83 |
| 3. | 67.64 | 19.32 | 3.38 | 9.66 |
| 4. | 65.42 | 28.04 | 6.54 | 0 |
| 5. | 65.42 | 23.36 | 6.54 | 4.68 |
| 6. | 65.42 | 18.69 | 6.54 | 9.35 |

For the above compositions, the pot life and related data are as follows, at room temperature of about 75°F. (± 10°).

| | Workable or Free Flow | Non-workable or Inoperative * | Full Gel | Cure |
|---|---|---|---|---|
| 1. | ½ hr. | 4 hrs. | 10 hrs. | 72 hrs. |
| 2. | 6–10 hrs. | 26 hrs. | 36 hrs. | 96 hrs. |
| 3. | 21 – 30 hrs. | 50 hrs. | — | 120 hrs. |
| 4. | 7 min. | 9 min. | 15 min | 72 hrs. |
| 5. | 1.5 – 6 hrs. | 7 hrs. | 12 hrs. | 72 hrs. |
| 6. | 12 hrs. | 24 hrs. | 36 hrs. | 96 hrs. |

* means that the composition cannot be worked under the conditions encountered in underground gas pipe in accordance with the teachings of Pat. Nos. U.S. 3,753,766 and U.S. 3,655,122.

| No. | % Epoxy | %LP3 | % BDMA | %Dimer (Empol 1010) | Pot life free flow | Gel Inop. |
|---|---|---|---|---|---|---|
| 7. | 68.0 | 23 | 3.45 | 5.55 | 3–4 hrs. | 6 hrs. |
| 8. | 68 | 19.6 | 3.45 | 8.95 | 4–5 hrs. | 8 hrs. |
| 9. | 68 | 22.2 | 5.18 | 4.62 | 2–5 hrs. | 8 hrs. |
| 10. | 68 | 18.52 | 5.18 | 8.2 | 4 hrs. | 8 hrs. |
| 11. | 68 | 20.14 | 6.66 | 5.2 | 2 hrs. | 5 hrs. |
| 12. | 68 | 17.0 | 6.66 | 8.34 | 3–5 hrs. | 6 hrs. |

All full cures in Nos. 7–12 were less than 5 days (120 hours), full gel ranged from 10–14 hours.

In the above tables and throughout the specification and claims all percentages are by weight unless indicated otherwise.

What is claimed is:

1. A liquid or semiliquid pipe line sealing composition for application in underground pipe lines, said composition comprising about 50–85% of a liquid epoxy resin, 1.5–10% of an amine curing agent, 2–15% of inert filler, at least 5% of a liquid uncured polysulfide polymer and 7–12% of a dimer and/or trimer acid, with the proviso that the total polysulfide polymer and dimer and/or trimer acid content is 35% or less, said composition having a pot life of more than 2 hours and a gellation period of 10–48 hours.

2. The composition of claim 1 wherein the epoxy resin is an epichlorohydrin type base epoxy.

3. The composition of claim 1 wherein there is about 55–70% resin, 10–25% polysulfide polymer, 2–8% amine curing agent, 7–15% inert filler and 7–12% dimer and/or trimer acid.

4. A method of prolonging the pot life and retarding the gel and cure time of a cureable sealing composition having 50–85% epichlorohydrin epoxy resin, at least 5% uncured polysulfide polymer, and 1.5–10% of an amine curing agent, comprising the step of blending into the composition a dimer and/or trimer acid, the amount of the acid being one-half to five times the amount of amine present in the composition and, together with the polysulfide polymer, totaling 35% or less of the final composition.

5. The method of claim 4, wherein the amine is a tertiary amine.

6. The method of claim 4 wherein about 10–25% of the polysulfide polymer is present in the composition.

* * * * *